(12) United States Patent
Cronce et al.

(10) Patent No.: US 7,483,860 B2
(45) Date of Patent: Jan. 27, 2009

(54) METHOD AND SYSTEM FOR MANAGING SOFTWARE LICENSES

(75) Inventors: Paul A. Cronce, San Jose, CA (US); Andrew A. Kirk, Saratoga, CA (US)

(73) Assignee: Pace Anti-Piracy, San Jose, CA (US)

( * ) Notice: Subject to any disclaimer, the term of this patent is extended or adjusted under 35 U.S.C. 154(b) by 533 days.

(21) Appl. No.: 10/094,435

(22) Filed: Mar. 8, 2002

(65) Prior Publication Data
US 2003/0172035 A1 Sep. 11, 2003

(51) Int. Cl.
*G06Q 99/00* (2006.01)
(52) U.S. Cl. .......................... 705/50; 713/188; 713/168; 709/223; 707/102
(58) Field of Classification Search ................ 713/168, 713/189, 188; 705/59, 40; 707/102; 726/29; 709/223; 380/201
See application file for complete search history.

(56) References Cited

U.S. PATENT DOCUMENTS

| | | | |
|---|---|---|---|
| 5,864,620 A | 1/1999 | Pettitt | |
| 6,480,959 B1 * | 11/2002 | Granger et al. | 713/189 |
| 6,611,812 B2 | 8/2003 | Hurtado | |
| 6,898,706 B1 | 5/2005 | Venkatesan | |
| 6,904,523 B2 | 6/2005 | Bialick | |
| 2001/0032207 A1 * | 10/2001 | Hartley et al. | 707/102 |
| 2002/0032763 A1 * | 3/2002 | Cox et al. | 709/223 |
| 2002/0091645 A1 * | 7/2002 | Tohyama | 705/59 |
| 2002/0120846 A1 * | 8/2002 | Stewart et al. | 713/168 |
| 2003/0084306 A1 * | 5/2003 | Abburi et al. | 713/188 |

OTHER PUBLICATIONS

Broderick, Martha A Gibson; Virginia R Tarasewich, Peter; Electronic signatures: They're legal, now what?, 2001, Internet Research, v11n5, p. 423-434.*

* cited by examiner

*Primary Examiner*—James P. Trammell
*Assistant Examiner*—Behrang Badii
(74) *Attorney, Agent, or Firm*—Strategic Patent Group, P.C.

(57) ABSTRACT

A method and system for managing licenses over a network is disclosed. The method and system include establishing a user account on a server coupled to the network from a user computer, and allowing the user to upload licenses used by the computer to the server. The server then associates the uploaded licenses with the user account, and allows the user to log into the user account to review the account and associated uploaded licenses. The user may also retrieve the licenses for download to the user computer in the case of a lost or damaged license.

14 Claims, 7 Drawing Sheets

METHOD AND SYSTEM FOR MANAGING SOFTWARE LICENSES

CROSS-REFERENCE TO RELATED APPLICATIONS

This application is related to U.S. patent application Ser. No. 10/072,597entitled "METHOD AND SYSTEM FOR DELIVERY OF SECURE SOFTWARE LICENSE INFORMATION" filed on Feb. 5, 2002, U.S. patent application Ser. No. 10/080,639 entitled "DELIVERY OF A SECURE SOFTWARE LICENSE FOR A SOFTWARE PRODUCT AND A TOOLSET FOR CREATING THE SOFTWARE PRODUCT" filed on Feb. 21, 2002, and U.S. Pat. No. 7,032,240 entitled "PORTABLE AUTHORIZATION DEVICE FOR AUTHORIZING USE OF PROTECTED INFORMATION AND ASSOCIATED METHOD" , all assigned to the assignee of the present invention, and herein incorporated by reference.

FIELD OF THE INVENTION

The present invention relates to software licenses, and more particularly to establishing a record of licenses used on a user's computer such that licenses can be reviewed or retrieved for download to the user's computer in the case of a lost or damaged license.

BACKGROUND OF THE INVENTION

The usual method of selling software is to sell a license to use the software. The license typically includes various restrictions, known as license terms. Software can be delivered with a written license document. However, it is easy to duplicate the software and distribute it illegally with this method. To prevent piracy of the licensed software, many techniques to prevent copying software have been used. Some methods are focused on making the actual software difficult to copy. Other methods use an electronic form of the license terms as a method of limiting distribution of the software.

The electronic licenses are of course subject to hacking and piracy as well. Various methods of increasing the security of an electronic software license have been developed. The assignee of the present invention, has developed a method of delivering secure licenses for this purpose, as described in U.S. patent application Ser. No. 10/072,597 entitled "A METHOD AND SYSTEM FOR DELIVERY OF SECURE SOFTWARE LICENSE INFORMATION" and U.S. patent application Ser. No. 10/080,639 entitled "DELIVERY OF A SECURE SOFTWARE LICENSE FOR A SOFTWARE PRODUCT AND A TOOLSET FOR CREATING THE SOFTWARE PRODUCT."

The assignee has also developed an external security device for storing software licenses in which the licenses are accessed by plugging the external device into an I/O port of the user computer, as described in U.S. Pat. No. 7,032,240 entitled "PORTABLE AUTHORIZATION DEVICE FOR AUTHORIZING USE OF PROTECTED INFORMATION AND ASSOCIATED METHOD," assigned to the same assignee of the present invention describes such a device.

During the use of licenses by a user, it is not uncommon for a license to be damaged or lost, due to a computer malfunction, virus, hardware failure, or mechanical damage. In this case, the user faces a difficult chore of acquiring new licenses from the various software publishers. This is not only a time consuming process, but also typically cannot be accomplished without having to purchase new licenses, where proof of purchase cannot be produced. Often, enough time has passed that the original version of the software is no longer available, and a new version must be purchased.

Accordingly, what is needed is a method for managing licenses that enables a user to easily retrieve a license in the case where the license is damaged or lost. The present invention addresses such a need.

SUMMARY OF THE INVENTION

A method and system for managing licenses over a network is disclosed. The method and system include establishing a user account on a server coupled to the network, and allowing a user to upload licenses used by the user's computer to the server. The uploaded licenses are then associated with the user account, and the user is allowed to log into the user account to review the account and associated uploaded licenses. The method and system further include allowing the user to review and retrieve the licenses for download to the user computer in the case of a lost or damaged license.

According to the system and method disclosed herein, the present invention allows the user to establish a record of user licenses, and to recover licenses in the case of a lost or damaged license.

DETAILED DESCRIPTION

The present invention relates to a method for managing software licenses over a network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
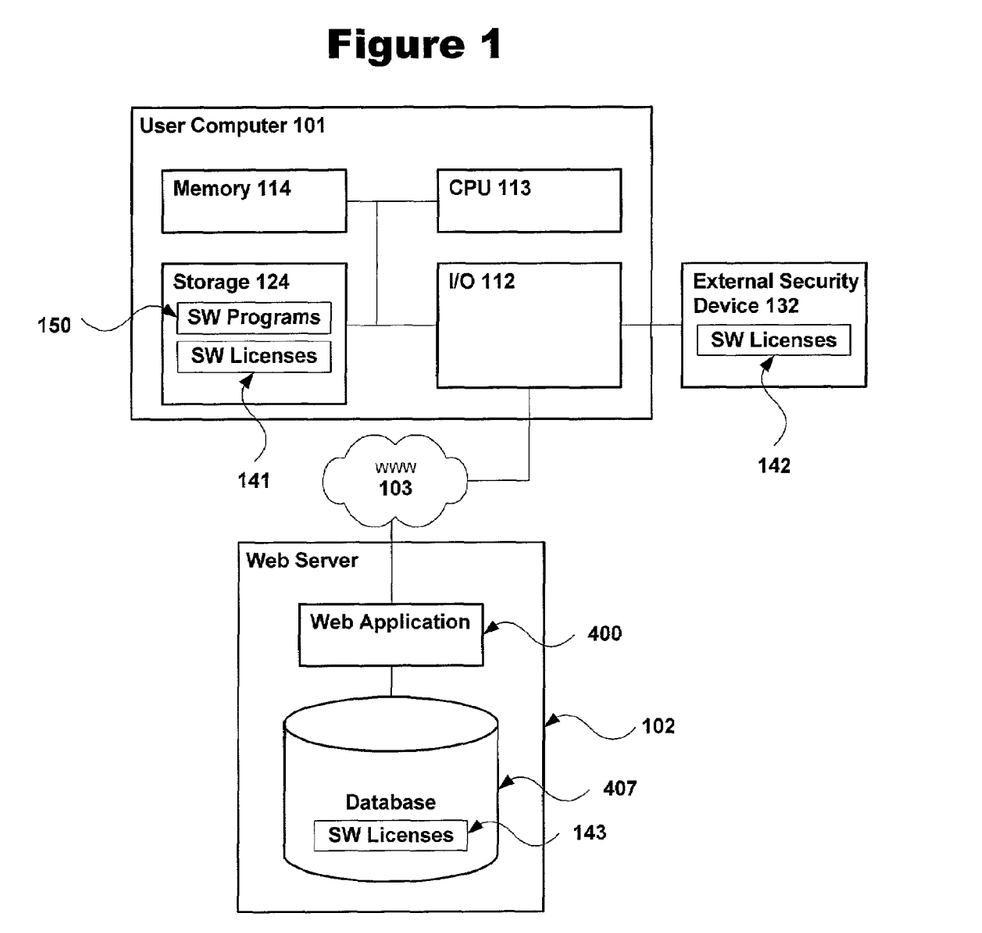
FIG. 1 is a block diagram of the system used to implement the present invention.

FIG. 1 is a block diagram illustrating a license management system in accordance with a preferred embodiment of the present invention. The system includes a user computer 101, a network 103, and a web server 102. Additionally, in the preferred embodiment, an external security device 132 may be coupled to the user computer 101 to provide a secure storage for software licenses 142.

User computer system 101 preferably comprises a microprocessor or CPU 113, a memory system 114, and input/output hardware 112. The input/output hardware 112 is preferably connected the network 103, and optionally to the external security device 132. Other I/O devices may be connected to the I/O 112, such as keyboard, mouse, trackball, and display, as required (not shown). Finally, a storage device 124, such as a hard disk or flash memory is connected to I/O 112, and supplies non-volatile storage for user computer 101. Stored on this device are licensed software programs 150, unlicensed software programs (not shown), and software licenses 141. The licenses for licensed software programs 150 may reside either on the storage device 124 or the external security device 132, according to the present invention.

The network 103 is also connected to web server 102. The connection to the network 103 may take various forms, including wireless, DSL, dial-up, or IR. Other variations of the user computer, such as PDA's, are well known by one skilled in the art, and thus will not be described in more detail herein. According to the present invention, web server 102 includes a web application 400 and associated database 407, which contains software licenses 143 that have been uploaded from user's computer 101 over network 103. Web server 102 contains other software and hardware that is known to those of ordinary skill in the art, and will not be described in more detail herein.

In operation, the user connects to the web application 400 using a web browser on the user's computer 101, and sets up an account. Next, the user uploads software licenses, either from the hard disk 124 (software licenses 141), from an external security device 132 (software licenses 142), or by entering data from written licenses into web forms provided by the web application 400. Written licenses typically include a serial number or CD key. These licenses are then uploaded to the web server 102 through network 103, and stored in the database 407 by web application 400.

These on-line software licenses 143 are now available for the user in case of loss of license information on computer 101 or security device 132. For example, if hard disk 124 crashes and all data is lost, the user will be able to recover the license information to enable reloading the software onto a new hard disk. Alternately, if the user accidentally drops and breaks the external security device 132, a new one can be purchased and the software licenses 142 can be restored from software licenses 143 stored in database 407. This is accomplished by the user logging into his account via web application 400 and selecting a download license function from the functions menu or links. In this way, the present invention can provide backup and restoration of license information in case of lost or damaged licenses, hardware, or software. Additional advantages of the present invention will be described below.

Figure 2:
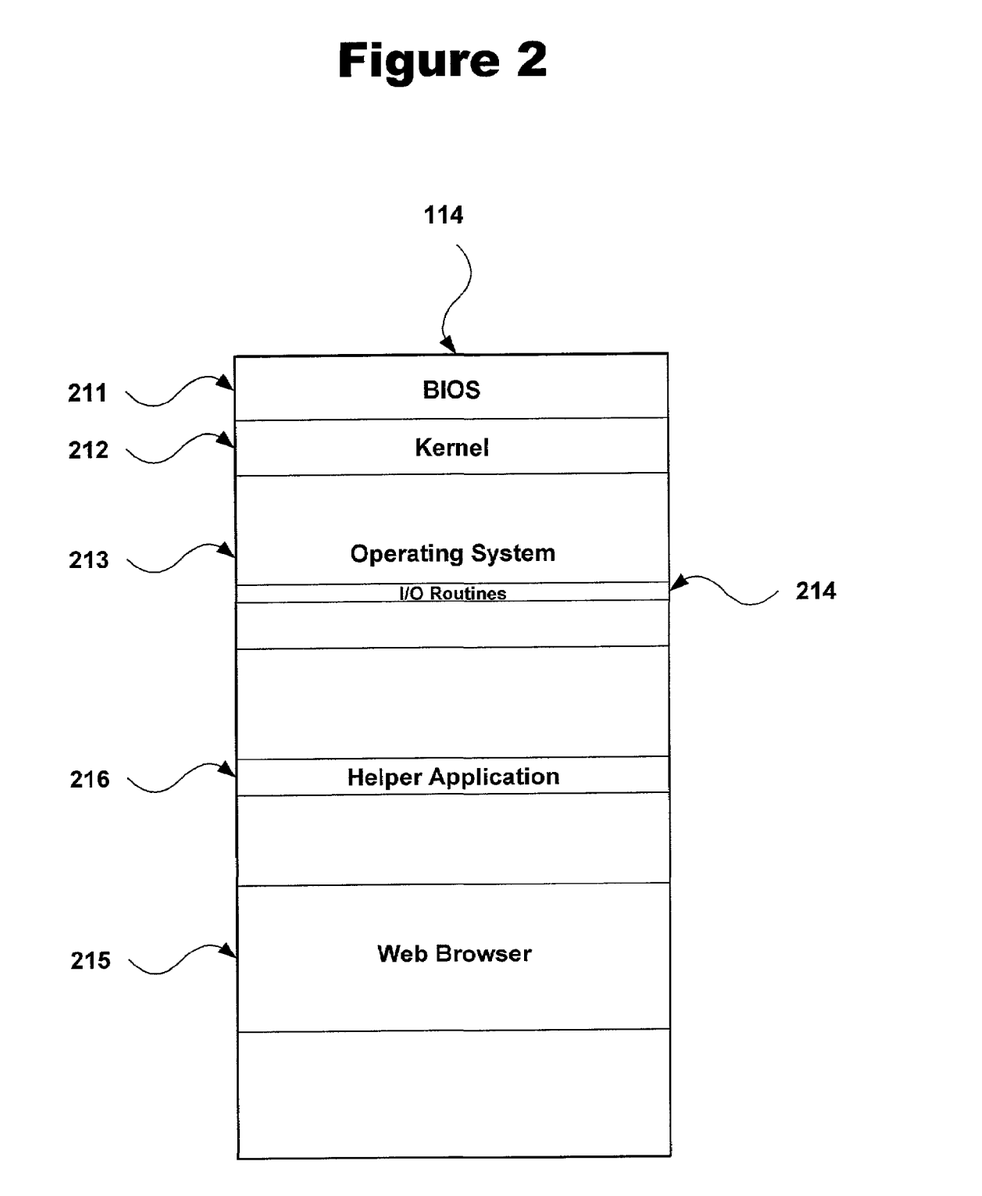
FIG. 2 is a block diagram of the software to implement the present invention on the user computer.

Referring now to FIG. 2, a block diagram of the software used to implement the present invention on the user computer is shown. The software is loaded into memory system 114 of computer system 101. Various components of the computer system software are shown. This includes the basic I/O system (BIOS) 211, the Kernel 212, the Operating System 213, and the I/O Routines 214 required for communicating over the network. These routines are shown within the Operating System 213.

In the preferred embodiment, a typical web browser 215 is used to access the web site's server 102. In the preferred embodiment, an additional "helper" application 216 is downloaded into the user computer 101 to facilitate automatic remote retrieval of licenses to operation from the user's computer to the server 102. This download typically occurs as part of the user account setup process described below. The helper application registers a unique file extension with the operating system 213, such that the helper application will be invoked whenever a file with that extension is received during normal operation of the browser 215. This capability is well known by those of ordinary skill in the art, and will not be described in more detail herein.

Figure 3:
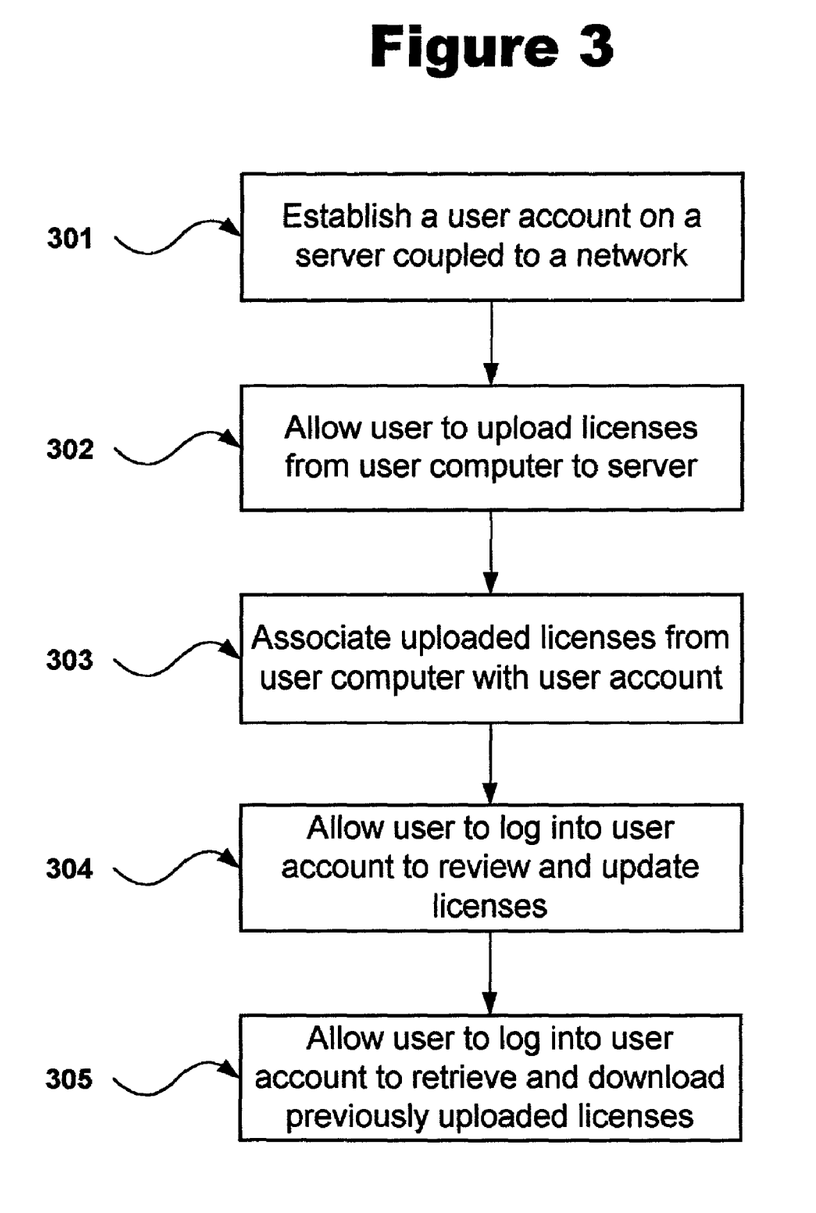
FIG. 3 is a flow diagram of the present invention.

Referring now to FIG. 3, a flow diagram of the present invention for managing software licenses is shown. The process begins with step 301, where a user account is set up on server 102 over network 103. In the preferred embodiment, the user interacts using the web browser by "surfing" to the home page of the web application on server 102 used to implement the present invention. The term "surfing" refers to providing network addresses to the browser by clicking on links on the user computer or on web pages from various web sites on the network, or manually entering the address of a web site into the browser. Once arriving at the home page for the server 102, the user may select a link labeled "Set Up a New Account," for example. This link would access a web page on serer 102 where the user can enter the required information to enable the web application to set up an account for the user, such as name, address, phone number, email address, and optionally credit card information, if the service provided is fee-based rather than free.

Once the user account has been set up, the user is allowed to upload from his computer license files 141 and 142 for his licensed software 150 to the server 102 in step 30. These license files may be located on the user computer hard disk 124, on the external security device 132, or be a set of manually entered information provided by the user from printed license documents. In the latter case, the user would supply any authentication keys, CD keys, or serial numbers required to successfully install the licensed software on his computer. Other useful information includes the software product name and version number. Other information may be required: some software requires both an ID and serial number, for example. Additionally, the user may wish to provide the publisher name, date of purchase, location of purchase, and publisher contact information. In the preferred embodiment, the information provided manually by the user would be entered into a web page form provided by server 102, and submitted to the web application on server 102 with a click on a "submit" button. An example of a submission might look like this:

Product Name: Photoshop
Version: 6.0
Type: Upgrade
Publisher: Adobe Systems, Inc.
Serial Number, ID or CD Key: PWM500D7R511378-234
Other Requirements: Requires Photoshop 4.0 disk Using this information, the user would be able to load a copy of Photoshop into his computer, using any Photoshop 6.0 disk. The key information here is the serial number. Because Adobe Systems, Inc. provides the serial number on small stick-on labels it is easy to misplace them. Even worse, in this example, an "upgrade" from a previous version was purchased, typically at a lower price then the full 6.0 version in the example. In this case, the original 4.0 "full version" disk is required in order to install the upgrade disk. This is critical information for the user to remember. In order to reinstall the Photoshop 6.0 software, both the 6.0 and 4.0 disks are required, along with the serial number.

In the preferred embodiment, if an external security device 132 is used to store licenses, or if license files are stored on the computer hard disk 124, the "helper" application 216 is downloaded to the user computer during the user account setup process. This application responds automatically to a specific file extension. Thus, when the web application wishes to automatically retrieve license files stored on the hard disk 124 or external security device 132, the request is downloaded to the user computer 101 via the web browser 215 using the helper application's 216 unique file extension. In this way, the helper application 216 is invoked to process the request. The helper application 216 uses the operating system 213 to access the hard disk 124 to locate any license files, or uses the I/O routines 214 to communicate with the external security device 132 for the purpose of retrieving licenses stored on the external security device 132. Additional I/O routines (not shown) may be required to communicate with the external security device 132. Typically, these additional I/O routines are installed at the time of the security device 132 first use using software provided with the security device 132, or from system files located on the user computer hard disk 124.

The helper application 216 may only search for license files on the hard disk 124, or may only search for license files on the optional external security device 132, depending on the method of license storage used by the software product publishers who licensed the software to the user. In any case, the software product licenses are uploaded to the server 102, either automatically from the helper application 216 or from user-entered data as described above.

Next, in step 303, the uploaded license information 143 is associated with the user account. Typically, this is done using a database 407. The operation and use of databases is well known by those of ordinary skill in the art, and will not be described in more detail herein. At this point, the user has successfully stored software licenses on the server 102. In step 304, the user can optionally return at a later time to review the licenses and license information, or to update license information. Updating license information can include editing information, adding new information, or uploading additional software product licenses. Finally, in step 305, the user can optionally return to retrieve for download the stored license information, in the case where one or more licenses were damaged or destroyed by a software or hardware failure on the user computer, or by the action of a computer virus, a hacker, or mechanical damage. Alternatively, the user may purchase a new computer and want to transfer all or some licensed programs 150 to the new computer, and would require license information for that task.

According to the present invention, other reasons for accessing the user account include selling and transferring licenses to other users, receiving updated license information such as new features or extending time-limited license terms, or even temporarily transferring licenses to other users for rental for a specified period of time.

Figure 4:
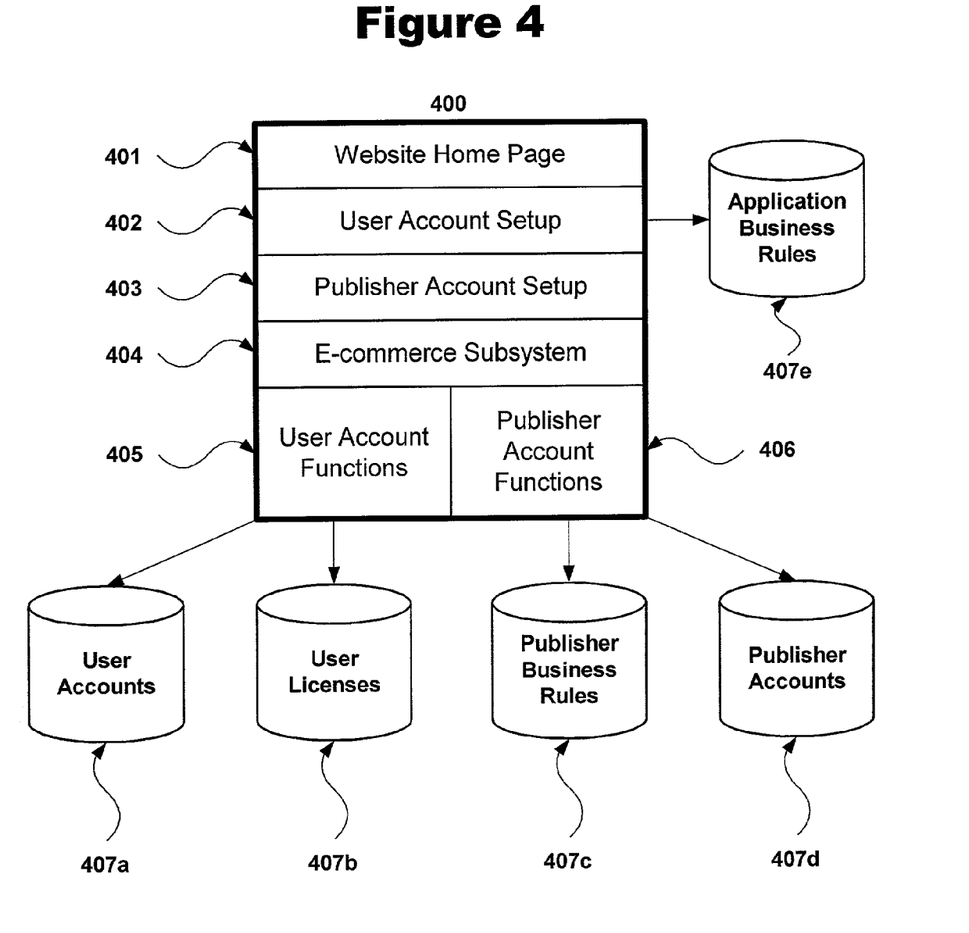
FIG. 4 is a block diagram of the license management web application used to implement the present invention

Referring now to FIG. 4, a block diagram of the license management web application used to implement the present invention is shown. The web application 400 is typically a collection of web pages, active server pages (ASP), or other web application technology, running on the web server, and including various required software modules necessary for the proper operation of the license management website. In the preferred embodiment, one of the modules is a copy of the helper application (not shown). There may be multiple copies required, one for each type of user computer 101, such as one for Microsoft Windows 95/98, one for Microsoft Windows NT/2000, one for Apple Macintosh OS/9, and one for Apple Macintosh OS X. The operation of a website is well known by those of ordinary skill in the art, and will not be discussed in detail herein.

Typically, a home page 401 is used as an entry point into the application 400. From here, links or buttons will lead a user to appropriate pages in the website, for example, a page for user account setup 402, and a page for publisher account setup 403. User account setup has been described in detail above. The data from user accounts is stored in database User Accounts 407a, and uploaded license information is stored in database User Licenses 407b. Application 400 also includes user account functions 405 for accessing and processing user account information and user license information. Other pages for user login, user account management, and license review and updates are not shown, and would also access User Accounts 407a and User Licenses 407b databases, either using user account functions 405 or by direct access to the databases using database queries. Various rules are also required for the correct operation of web application 400. These business rules are often also stored in a database, such as Application business rules 407e. These rules control the setup and use of accounts, including specifying required fees and service level options, for example. In the preferred embodiment, software publishers may also have accounts 407d on the web application 400, set up using the publisher account setup page 402. This is important to allow the website to facilitate transactions between the user and the publisher. This is especially useful when license files can be automatically retrieved from the user computer 101, either from the hard disk 124 or external security device 132. Specifically, the publisher has the ability to grant new, additional, or replacement licenses for its software products, and is typically interested in maintaining contact with the user to apprise the user of and sell product updates and new products, to provide a mechanism for making offers available from the publisher partners, and to maintain control over the licensed products. Additionally, the publisher may wish to use the web application 400 to assist in customer support functions.

The publisher will typically establish a set of business rules for dealing with customers. These rules are stored in a database Publisher Business Rules 407c associated with the publisher accounts stored in Publisher Accounts 407d database., and are typically entered using various web page forms provided by web application 400 (not shown). These business rules allow the web application 400 to manage the functions of the web application according to the wishes of the publisher. For example, one software publisher may have a business rule that allows a user to acquire a replacement license for 30 days, during which time the user must provide proof of loss. Another publisher may require full payment for a replacement license, and provide a full or partial refund upon proof of loss. One publisher may allow a user to resell their license. Another may not. All of the rules associated with various functions that the website can provide can be programmed via web page forms provided to the publisher during the publisher account setup process. These rules 407c and publisher accounts 407d can be accessed directly with database queries, or via publisher account functions 406 for use by the web application in providing service to the publishers and users.

While FIG. 4 shows a plurality of databases 407a through 407e, one of ordinary skill in the art will recognize that this data can be stored in a single database in separate tables, or in various other arrangements. Typically, the data in each database shown is "related" to the other databases shown. This allows accessing the appropriate information stored in one database from information stored in another. For example, a user account is associated with one or more licenses. By accessing the user account in User Accounts 407a, one can then look up all user licenses associated with the user account in User Licenses 407b. Likewise, a software publisher can access all user licenses for software products provided by the publisher by first logging into the publisher account in Publishers Accounts 407d, and then accessing related licenses in User Licenses 407b. The operation of relational databases is well know to those of ordinary skill in the art, and will not be described in more detail herein.

According to a further aspect of the present invention, the web application 400 also includes an e-commerce subsystem 404 that is used to collect fees from the publisher or user, depending on the application business rules 407e. There are many ways that fees might be collected. For example, the service provided by the web application 400 could be associated with a single, one-time setup fee to either or both user and publisher, or could be associated with a recurring fee, such as a yearly service fee. Additionally, service provided between the publisher and user could be fee-based. For example, the web application 400 could provide a mechanism for special offers for upgrades and other products when the user logs into his account. If the user buys an upgrade or additional product, some of the proceeds can be diverted to the licensing management website owner, and the remaining proceeds transferred to the publisher. The business rules 407e for the website or the publisher business rules 407b would hold the information related to these transactions, including setting the amounts paid by the user and the fee paid for the service by the web application.

Additionally, the web application could provide a means for one user offering for sale a software license no longer needed, or even a time-based rental. For example, if a user is going on a long vacation, or is working on a project, and will not require a particular software package for a period of time, the license could be temporarily transferred for a fee to another user. In this case, the license owner would receive a rental fee, and the license management website owner may receive a commission for the service of transferring and controlling the license. Additionally, the publisher may receive a fee for allowing rentals to take place. The ability to transfer a license—either permanently or temporarily—would be controlled by the publisher business rules 407c. For security purposes, this transfer would most likely only be allowed if the license could be guaranteed to be only in one place at a time. This would be possible in at least two cases:

1. External Security Device: as described in U.S. Pat. No. 7,032,240 entitled "PORTABLE AUTHORIZATION DEVICE FOR AUTHORIZING USE OF PROTECTED INFORMATION AND ASSOCIATED METHOD" cited above, a license file can be securely transferred into an external security device by several means, including direct from the internet, from a floppy disk, or from a plug-in card. In this case, the security link between the web application and the external security device is sufficient to ensure only one working copy of a license is available at any given time. The method for transfer of licenses between the server and the external security device will be described on more detail below, in conjunction with FIG. 5.
2. License Files: as described in U.S. patent application Ser. No. 10/072,597 entitled "A METHOD AND SYSTEM FOR DELIVERY OF SECURE SOFTWARE LICENSE INFORMATION" cited above, a license file may be securely transferred to a computer from a server. The method for ensuring only one working copy is available at any given time will be described below, in conjunction with FIG. 7.

Figure 5:
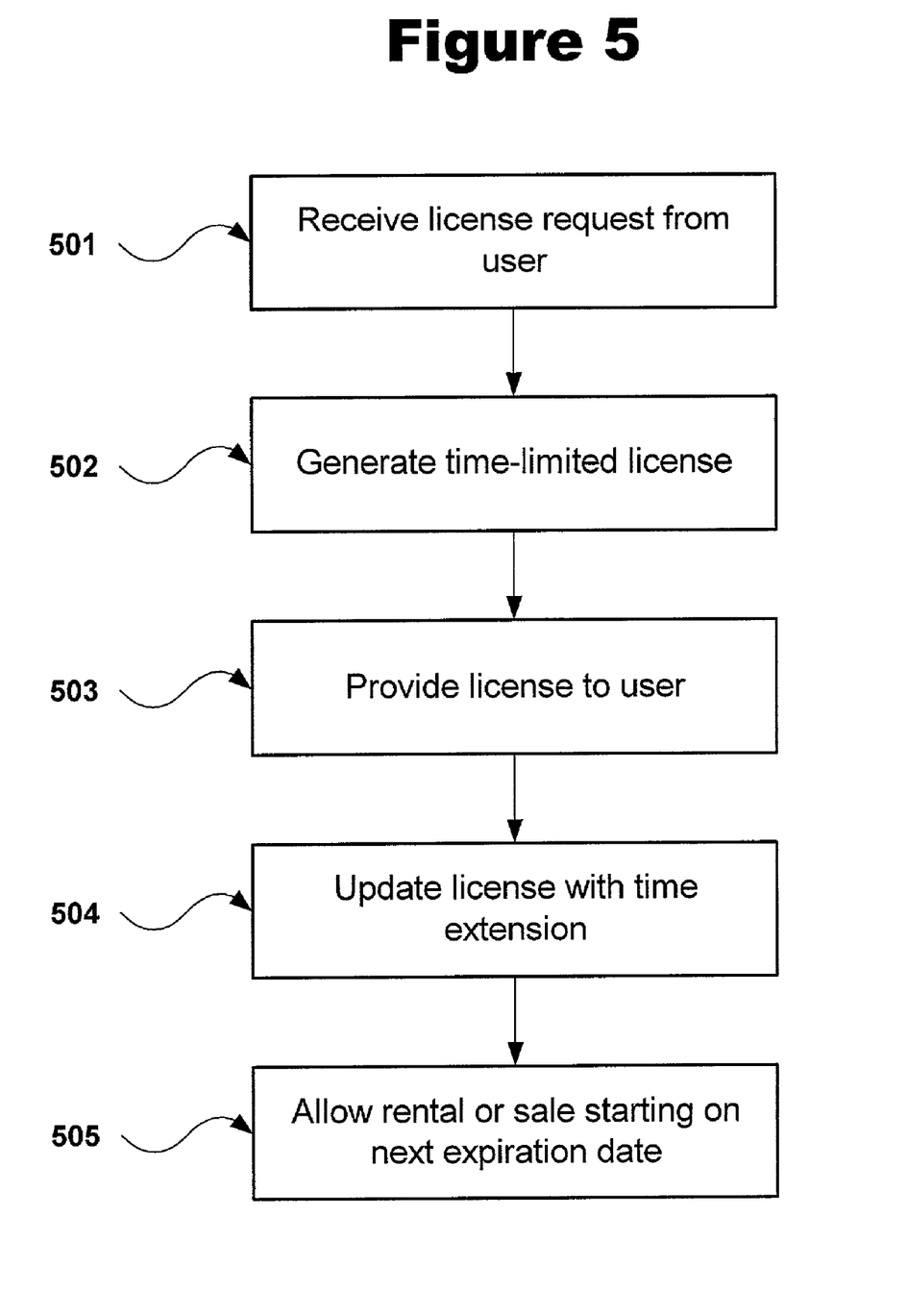
FIG. 5 is a flow diagram of the process of ensuring that only a single working copy of a license file stored in an external security device is available at any given time.

Referring now to FIG. 5, a flow diagram of the process of ensuring that only a single working copy of a license file on the user computer 101 or external security device 132 is available at any given time is shown. The process begins when the license management website receives a license request 501 from the user. This request can actually come in various ways, including from the user running a downloaded copy of the licensed software from a purchase transaction on the publisher website, or via a phone call from the user, for example. The license request typically includes information, such as product information, and may also include user information, user computer fingerprints, and financial transaction information. The request information is used to generate a license document in step 502. However, even though a user may have purchased a permanent license for the product, a time-limited license is created. The time period for the license can be set by the business rules 407c. The time-limited license is provided to the user in step 503.

After the time period elapses, the license expires, and the software product will not function. In this case, the software product may automatically request a license extension, or the user may request an extension in various ways, such as logging into the web application 400, or calling the publisher, and requesting the extension. In either case, in step 504, the user license is updated as needed to maintain use of the software product. In the preferred embodiment, this process happens automatically in the background over an open connection to the Internet, to reduce interference with the user's use of the product. There are many possible variations of this process, such as specifying in the license that the user may continue using the software product for a period of time after the expiration date, to eliminate customer frustration caused by unavailable network connections, or by requesting a license update a few days prior to the date the license expires, for example.

In step 505, the user can be allowed to rent or sell the license to another user, starting on the expiration date of the current license received from the server in step 504 or 503, if allowed by the publisher business rules 407c and application business rules 407e. In effect, by time-limiting the license file, it is possible to ensure that when it is transferred to another user, the original user cannot use the license at the same time. If the license also includes machine fingerprint information, preventing the license from being used on any other computer, the security of the license is substantially higher.

Other embodiments of step 505 are possible. For example, the publisher rules database 407c may allow rental periods or resale to start prior to the expiration date, where a limited overlap of potential license use may occur. The publisher may require an additional fee for this feature. Likewise, the publisher may allow an overlap at the end of a rental period, also optionally for an additional fee. Some of these variations are described in more detail below.

Figure 6:
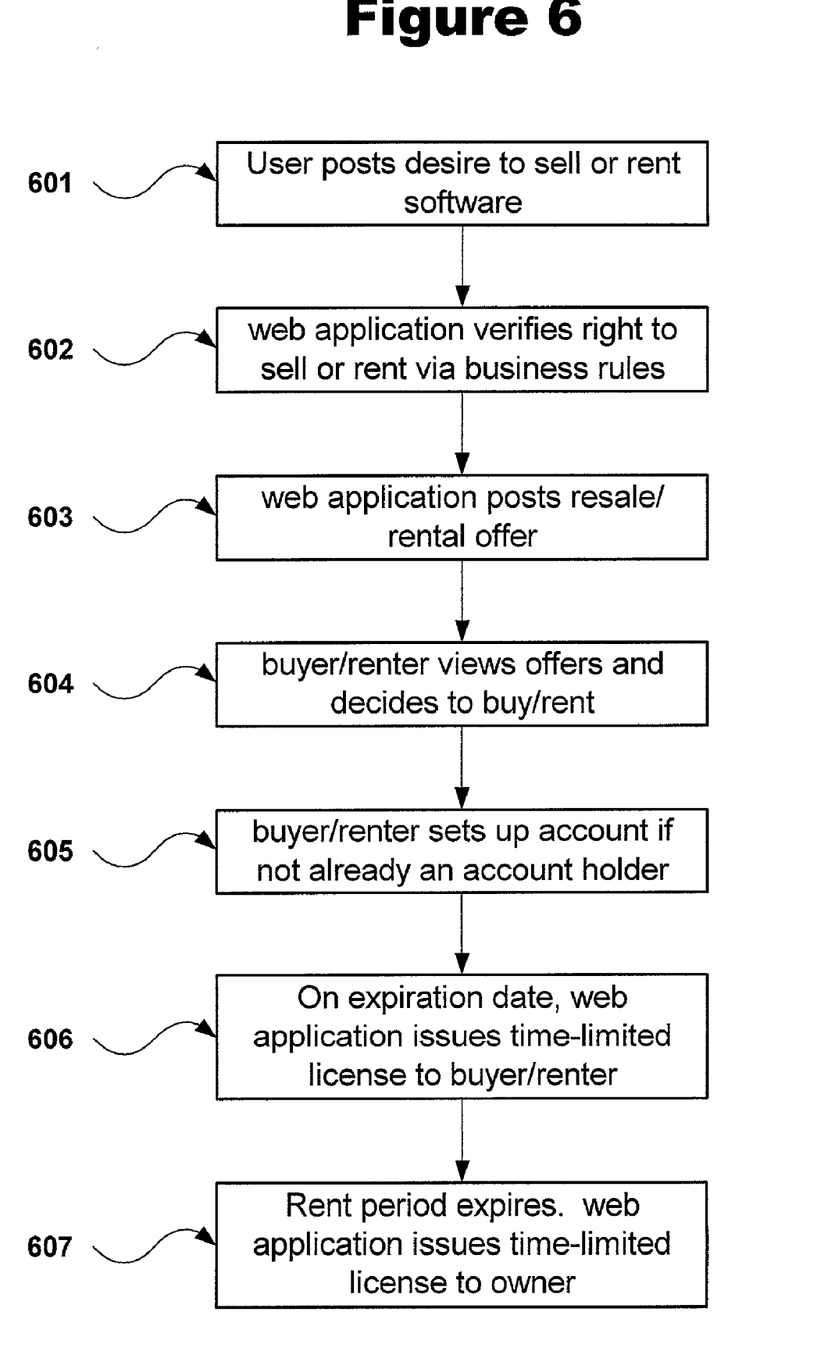
FIG. 6 is a flow diagram of the process of reselling or renting software licenses.

Referring now to FIG. 6, a flow diagram of the process of reselling or renting software licenses is shown. In step 601, the user posts his desire to either rent or sell one or more software licenses to the web application 400. This is done typically by the user logging in to his account and selecting the appropriate menu item or link. This will access a web page where the user can select from his available licenses and indicate his desire to sell or rent. The request is associated with one or more licenses already loaded into the user account, and already issued to the user as time-limited license files. In step 602, the web application 400 verifies that the requested transactions are allowed according to the publisher business rules 407c for each of the software licenses in the request. Any financial requirements, such as fees required by either or both the web application 400 owner and the software publisher would be presented and must be accepted by the user. In an alternate embodiment, only licenses from publishers who allow resale or rental will be provided in the selection page presented by the web application 400 in step 601, thus combining step 601 and 602 into a single operation. Next, in step 603, the web application 400 posts the sale or rental offer information on the appropriate web page, such as a Software Rental Center page, or a Software For Sale page. Typically, the data related to the transaction is stored in a database. Specifically, the information may be stored in the User Licenses 407b database, or in a separate For Sale or For Rent database (not shown). The expiration dates of the last issued software license for each product would constitute the start date for any rental or sale. The user would be allowed to set the sale price or rental price in the preferred embodiment. In alternate embodiments, the web application 400 would set standard pricing based on publisher business rules 407c or web application business rules 407e.

In step 604, a buyer/renter views the offer to sell or rent one or more licenses. In step 605, the buyer/renter sets up an account on the web application 400 if one does not already exist, and enters the information necessary to allow financial transactions for payment of the rental or purchase price, including any fees to the web application owner or publisher. The actual financial transaction may not take place until the licenses are issued on the expiration date.

In step 606, the time-limited licenses are issued to the renter/buyer. In the preferred embodiment, the licenses are issued when the buyer/renter pays for them. However, since the expiration date may not have yet occurred, the issued licenses may include a start date as well as an end date. Alternatively, the licenses can be issued on the expiration date. Depending on business rules, the publisher may allow an overlap, i.e., from the time the current owner offers the licenses for resale or rental to the end of the existing time period for the last issued license, the publisher may allow the next owner or renter to also have a concurrent license. In effect, there would be two licenses in operation at the same time for a short period of time. This option may be at extra cost to either or both buyer and seller.

In the case of a buyer, the process completes, with the updating of the new owner's account with the new license information (User Licenses 407b), and the deletion of the license information from the original owner's database (User Licenses 407b).

Once the transfer of license is completed between user accounts, the new owner or renter can download the license at any time. The related licensed software would also require downloading. Alternatively, if the licensed software is distributed on a CD, the CD must be mailed to the new owner or renter. In the preferred embodiment, all software for resale or rental would be electronically distributed.

In the case of a rental, the process continues in step 607, where the rental period expires, and the web application 400 issues a new time-limited license back to the license owner, and updates the User Licenses 407b database. Specifically, the license is deleted from the renter's account, and restored to the owner's account. In the same way as above, this license can be issued immediately and include a start date as well as an end date, can be issued on the expiration date of the rental, or can overlap for a short period, depending on the application business rules 407e or the publisher business rules 407c. As before, fees may be required for overlapping license terms.

Figure 7:
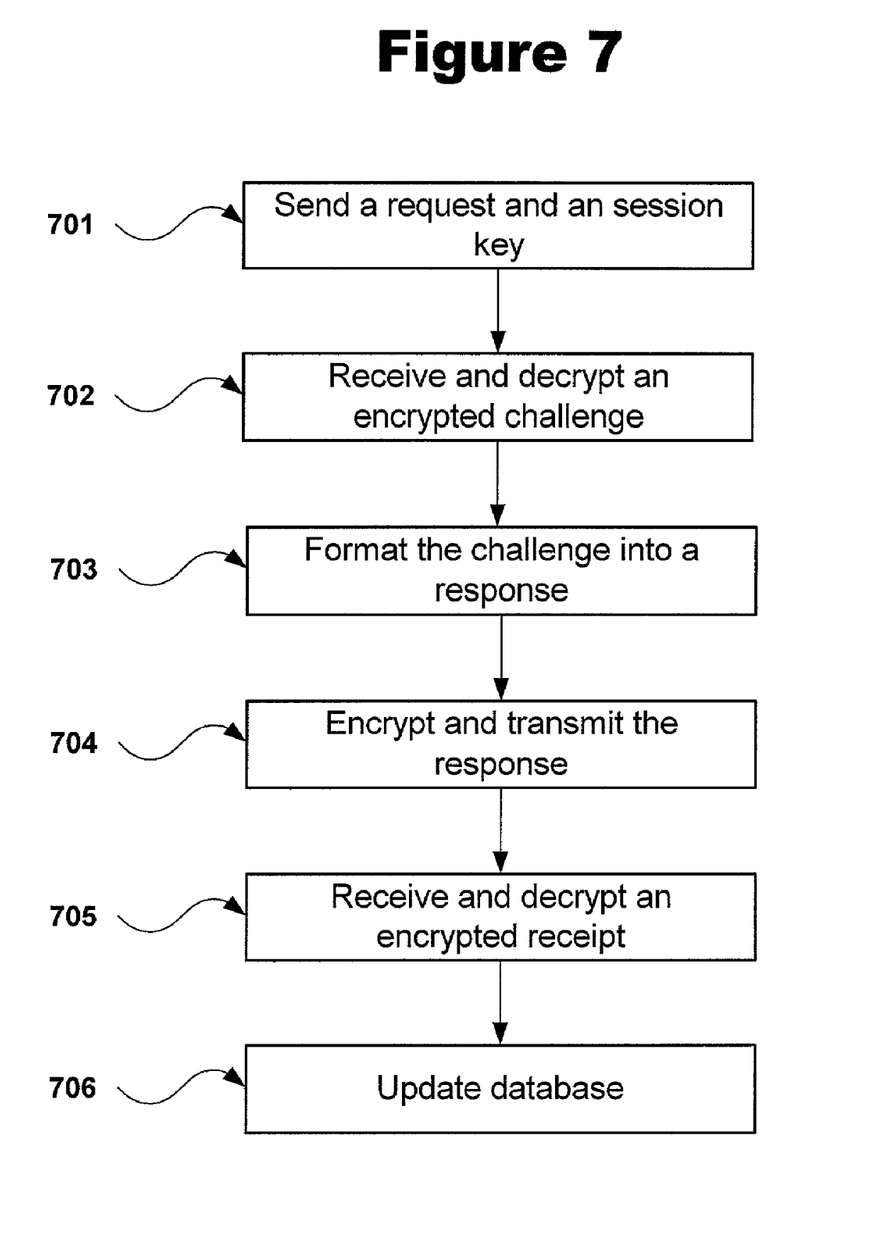
FIG. 7 is a flow diagram of the process of ensuring that only a single working copy of a license stored on an external security device is available at any given time.

Referring now to FIG. 7, a flow diagram of the process of ensuring that only a single working copy of a license is available at any given time is shown. This process, is specifically designed to work with the licenses 142 stored on external security device 132 communicating via the helper application 216 and browser 215 running on user computer 101 with web server 102 over a network 103. In this case, the helper application has the required functionality to communicate with the external security device 132, and by using the operating system file extension function, can be automatically invoked for processing a specific file type received by the browser 215, as described above. FIG. 7 differs from FIG. 5 in that FIG. 7 applies to the use of an external security device 132 only, while FIG. 5 applies to both licenses 141 stored on the user's hard disk 124 and to licenses 142 stored in an external security device 132. The additional security afforded by the external security device 132 allows a license to be securely transferred with or without use of time-limited license terms, while license files stored on the user's hard disk 124 cannot be so securely controlled. Specifically, a use may make one or more copies of a license file prior to connecting to web application 400, and thus there can be no guarantee of a single license without use of time limited license terms.

Referring again to FIG. 3, step 302, where the user uploads license information to the server 102, in the case where the user has an external security device 132 containing licenses, the server 102 can automate the upload process using helper application 216. Specifically, in step 701, a command to locate and retrieve license information can be downloaded via browser 215 to the helper application 216. The command includes the session key. The session key is essentially a random number used to randomize the secure transactions between the server and security device 132. Helper application 216 then searches for the external security device 132. If it cannot be found, the user is prompted to insert it into the appropriate I/O socket. Once the security device 132 is found, the command is transmitted to the security device 132 using the appropriate protocol, along with the session key. The security device 132 then returns an encrypted log of existing licenses. The encryption is accomplished with a secret key stored within the security device 132, only known to an issuing authority, and in the preferred embodiment, stored in another external security device (not shown) plugged into an I/O port of the server 102. The log information is randomized using the session key in conjunction with a reversible mathematical operation, and then encrypted using the secret key. Alternatively, the helper application 216 or the web application 400 may be required to request each license in a separate transaction. By providing a single log function, the transaction time can be minimized.

The function of the session key is to ensure that every interaction between the server 102 and the external security device 132 is different, and that information transferred from the device cannot be memorized and provided by a substitute device. The function of the external security device (not shown) connected to the server 102 is to ensure that the secret keys for the external security device 132 and others like it are not available by hacking into the server. A server security device (not shown) is responsible for applying the session key to randomize, as well as decrypting and encrypting, and never exposes the secret keys or the randomizing function.

Referring again to FIG. 7, step 701, where the request is sent to the external security device 132 from the server 102, along with a session key, generated randomly at the start of the transaction. As described above, the browser 215 and helper application 216 in the preferred embodiment facilitate all transactions between server 102 and security device 132. Other embodiments are possible, including a specialized application running on the user computer 101 specifically designed for communicating with the server 102 and any license files on the hard disk 124 or security device 132. There are many embodiments of this process that are well known by one of ordinary skill in the art, and will not be described in detail herein.

The security device 132 receives the request and the session key, and a challenge is prepared, using the private key and the session key to encrypt requested information. The challenge information sent will depend on the request. One example is a request for a log of all licenses stored on the device. Another is a request for a specific license. The challenge is randomized and encrypted as described above, and returned to the server 102. In step 702, the challenge is received by server 102, and decrypted and derandomized by reversing the mathematical operation. In the preferred embodiment, the decryption and derandomizing is accomplished by sending a decryption request (the encrypted challenge) and the session key to the server security device (not shown). Alternate embodiments may have the encryption process and keys stored on the server 102 or a remote server (not shown). The decrypted and derandomized challenge information is received back from the decryption service, and in step 703, the challenge data is examined. By checking the contents of the response, to ensure that the secret key encrypted the challenge, the server can validate the challenge. Depending on the function the server is attempting to accomplish, various actions may be taken. If the only function is to receive a log of licenses stored on the security device 132, the process is now complete. Ideally, to maximize security on the server 102, the randomized and encrypted version of the log, along with the session key will be stored in the user license database 407b associated with the user. However, it is also very useful to store other information, to associate licenses from the user account with the related publisher account 407d, such as product name, version, date of purchase, etc. This information is may not be stored within the license information. In this case, the additional information must be accessed from a license database (not shown) provided by the security device 132 issuing authority. In the preferred embodiment, the issuing authority for the security device 132 is also the owner and operator of the server 102.

If the desired process shown in FIG. 7 is to move a license from the external security device 132 to the server 102, maintaining the existence of only one working license at any given time, then the process continues in step 703 by modifying the license information sent in the challenge into a response. The response license information will be modified, such as marking the license time-limited, or marking it for deletion. In step 704, the response is again randomized and encrypted using the secret key and the session key. In the preferred embodiment, this is accomplished by sending the response and session key to the security device (not shown) connected to server 102, and receiving the randomized and encrypted result back. The randomized and encrypted result is then sent to the browser 215 using the helper application 216 file extension, as described above. The helper application 216 is invoked, and the response and session key are transmitted to the external security device 132. The security device 132 decrypts the response using the private key and derandomizes using the session key. The response is then verified to ensure the sender used the same private key. The new, updated license information is now used to replace the previous license information. Thus, if a license was marked for deletion, the license no longer resides within the security device 132. If server 102 modified other license terms, then the license terms are now updated for the license stored in security device 132.

In the case of a delete or modify operation, an optional further step is useful to ensure completion of the operation. In this case, the external security device 132 generates a receipt indicating that the license has been deleted or modified. This receipt is also randomized and encrypted as before, and returned to the server 102. In step 705, the server receives the encrypted receipt. Finally, in step 706, the license database can be updated, indicating, in the case of a deletion, that the license on the server is now the only existing license, and is therefore available for download, resale, or rental. In the case of a modified license, such as the addition of a time limit, the license database can be so updated. If the receipt step 705 is not used, it is possible that the external security device 132 may be disconnected from the user's computer 101 between the time the challenge is sent and the response is received back, thus preventing the license from being marked for deletion, or preventing a change of license terms. Adding the receipt step ensures that the update requested has been performed within the security device 132.

It is possible to combine the process from FIG. 7 and FIG. 5 for the external security device 132. Specifically, rather than deleting the license stored in the security device 132 when moving it to the server 102, the license can instead be modified such that it becomes a time-limited license, as described in conjunction with FIG. 5. This means that the security device 132 must have regular updates of the license to maintain use of the software. One advantage of this approach is that a stolen security device 132 will only operate properly until the license expiration date. At that time, it must be updated from the server 102 to enable the licensed software to be operable. Assuming the original owner has reported the security device 132 as stolen, the licenses will not be updated by the server 102, because the server 102 will recognize the serial number of the security device 132 transmitted as part of the license log. In this case, the server 102 may send a command to deactivate the security device 132 completely, or just delete all licenses stored on the device. All of this can be accomplished by the process of storing lost or stolen security device 132 serial numbers in a database at the server 102, checking the list each time a new connection is established with a security device 132, and deactivating any security device 132 that matches the serial number in the database.

The other advantage of using time-limited licenses with the security device is that the publisher, in cases of loss or theft, can readily replace licenses because the publisher knows that the stolen or lost licenses are going to automatically expire. If the licenses are permanent, i.e., not time-limited, then the publisher has to consider the possibility that the licenses are being used by someone—potentially even the user claiming loss—and may be unwilling to replace the license at no cost or a small service fee.

In the preferred embodiment, transactions between the browser 215 and the server 102 are formatted as signed XML documents, using a proposed standard. This method guarantees that the documents have not been tampered with. Specifically, using the embedded certificates and public keys, along with private keys, the validity of the document can be demonstrated, and the identity of the sender can be verified. This process of validation and verification is described in detail in related U.S. patent application Ser. No. 10/072,597 entitled "METHOD AND SYSTEM FOR DELIVERY OF SECURE SOFTWARE LICENSE INFORMATION" cited above.

A license management system has been disclosed. The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a removable memory, or transmitted over a network, and loaded into a server for execution. Accordingly, many modifications may be made by one of ordinary skill in the art without departing from the spirit and scope of the appended claims.

What is claimed is:

1. A method for providing a license management system over a network, the method comprising:
   (a) establishing a user account on a server coupled to the network, wherein a user has obtained a copy of one or more software products from one or more software publishers, and wherein the software products have corresponding licenses;
   (b) receiving an upload of the corresponding licenses used by a user computer from the user computer to the server;
   (c) associating the uploaded licenses with the user account;
   (d) allowing the user to log into the user account and review the account and associated licenses, including allowing the user to manage each of the licenses individually according to business rules, wherein managing each of the licenses includes at least one of:
      (i) modifying license information,
      (ii) transferring the licenses to another account; and
      (iii) renting or selling the licenses;
   (e) allowing the user to retrieve and download the licenses to the user computer, and
   (f) searching an external security device connected to the user's computer for the licenses, and replacing the licenses accessed on the user's computer or the external security device with time-limited licenses, requiring the user to connect with the server on a regular basis to receive updated licenses to maintain licensed use of the software products.

2. The method of claim 1 wherein establishing (a) further includes associating a financial transaction with the establishment of the user account, where one setup payment is received.

3. The method of claim 1 wherein establishing (a) further includes associating a financial transaction with the establishment of the user account, where payments received are recurring based on time periods.

4. The method of claim 1 further including transferring licenses in formatted documents.

5. The method of claim 4 further including formatting the documents using a proposed signed XML document standard.

6. The method of claim 1 further including establishing a software publisher account on the server, including licensed product information, and associating licenses from user accounts with the related licensed product information in the publisher account.

7. The method of claim 6 further including receiving a setup payment from the publisher for setting up the publisher account setup process.

8. The method of claim 6 further including allowing the publisher to service the user by accessing and manipulating the licenses information associated with the publisher products in the user account.

9. The method of claim 8 further including receiving a payment from the publisher for each user license manipulation on the server.

10. The method of claim 6 further including allowing the software publisher to transfer additional licenses to the user for any of the publisher's licensed products, and associating a financial transaction with the transfer.

11. The method of claim 10 further including transferring a portion of the funds collected for transferred licenses information to the web application owner.

12. The method of claim 1 further including specifying a time period for the transfer, thus allowing a temporary transfer of licenses information.

13. An executable software product stored on a computer-readable medium containing program instructions for providing a license management system over a network, the program instructions for:
   (a) establishing a user account on a server coupled to the network, wherein a user has obtained a copy of one or more software products from one or more software publishers, and wherein the software products have corresponding licenses;
   (b) receiving an upload of the corresponding licenses used by a user computer from the user computer to the server;
   (c) associating the uploaded licenses with the user account;
   (d) allowing the user to log into the user account and review the account and associated licenses, including allowing the user to manage each of the licenses individually according to business rules, wherein managing each of the licenses includes at least one of:
      (i) modifying license information,
      (ii) transferring the licenses to another account; and
      (iii) renting or selling the licenses;
   (e) allowing the user to retrieve and download the licenses to the user computer; and
   (f) searching an external security device connected to the user's computer for the licenses, and replacing the licenses accessed on the user's computer or the external security device with time-limited licenses, requiring the user to connect with the server on a regular basis to receive updated licenses to maintain licensed use of the software products.

14. A method for providing a license management system over a network, the method comprising:
   (a) establishing a publisher account on a server coupled to the network, wherein a publisher provides of one or more software products, and wherein the software products have corresponding licenses;
   (b) receiving an upload of the corresponding licenses from the publisher to the server;
   (c) associating the uploaded licenses with the publisher account;
   (d) allowing the publisher to log into the publisher account and review the account and associated licenses, including allowing the publisher to manage each of the licenses individually according to business rules, wherein managing each of the licenses includes at least one of:
      (i) modifying license information,
      (ii) transferring the licenses to another account; and
      (iii) renting or selling the licenses;
   (e) allowing the publisher to retrieve and download the licenses to the publisher computer; and
   (f) searching an external security device connected to the publisher's computer for the licenses, and replacing the licenses accessed on the publisher's computer or the external security device with time-limited licenses, requiring the publisher to connect with the server on a regular basis to receive updated licenses to maintain licensed use of the software products.

* * * * *